Dec. 6, 1955  D. D. DOOLEY  2,725,947
SAFETY DEVICE FOR TRACTORS
Filed March 20, 1953
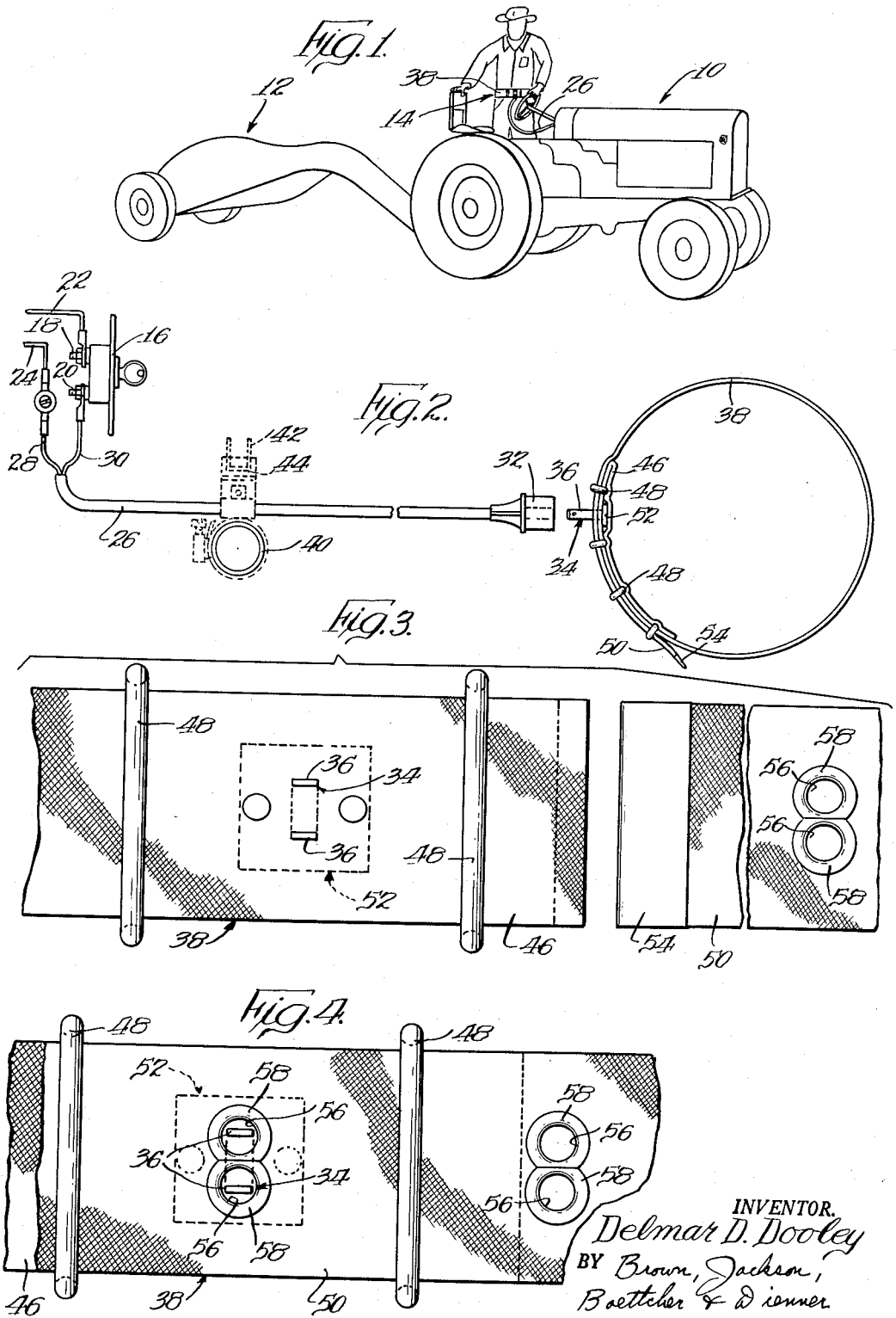
INVENTOR.
Delmar D. Dooley
BY Brown, Jackson,
Boettcher & Dienner
Attys.

United States Patent Office 2,725,947
Patented Dec. 6, 1955

2,725,947

SAFETY DEVICE FOR TRACTORS

Delmar D. Dooley, Rock Island, Ill.

Application March 20, 1953, Serial No. 343,719

3 Claims. (Cl. 180—82)

The present invention relates to safety devices adapted to protect drivers of tractors and the like from accidents and from their own folly. In particular, the present invention relates to an ignition control device for internal combustion engine operated vehicles, wherein the control means is carried by the vehicle driver or operator in couple with his body.

Heretofore, many safety devices have been proposed for vehicle operators, particularly for tractor drivers. Many of these devices comprise an ignition control switch for the internal combustion engine of the vehicle located at the driver's seat so as to be responsive to the presence or absence of the driver in or from the seat to close or open, respectively, the ignition circuit. However, such devices have proven unsatisfactory for the reason that it is a practical impossibility for a person to remain seated throughout a normal period of tractor operation. Most operators spend a great deal of time standing when operating a tractor. I am aware of one proposal that seeks to overcome the disadvantages of the seat switch safety device by employing three switches in parallel, namely, a seat actuated switch, a foot actuated switch and a hand actuated switch. The economic disadvantages of such proposal are obvious. Furthermore, the three switches still do not afford the operator the freedom of movement necessary. Accordingly, all of the devices of the prior art have failed to provide a satisfactory safety device.

That a safety device is required for tractor drivers is more than readily apparent for a brief perusal of any newspaper published in a farming community. Drivers fall or are jolted from tractors with the result that personal injuries are incurred in the fall; further personal injuries are incurred due to the tractor and machinery drawn thereby rolling over the fallen driver; frequently the driver is caught or becomes entangled in the machinery and is dragged along by the still moving tractor; and in addition, the tractor runs rampant to inflict personal injuries on others and to destroy and damage property. Another frequent source of injury is machinery that is power driven from the tractor, wherein the tractor driver attempts to clear a clogged or jammed condition in the machinery while the machinery is being power operated. For example, the corn harvesting machine or mechanical corn picker has a positive drive from the tractor and is also drawn by the tractor. A corn picker must be constructed so as to draw in and mangle standing corn stalks and to do so it must have snapping rolls and husking rolls sufficiently exposed to draw in the approaching stalks of corn. Openings large enough in proportion to take in corn stalks are also large enough to pull in a man's hand and arm when it is required to untangle stalks which have becomes clogged in the mechanism. Despite warnings, however, corn picker operators, when the picker becomes clogged, will invariably stop the forward progress of the tractor and attempt to clear the clogging while the picker is being power-driven. The number and seriousness of the injuries caused by such action is staggering. Death is not uncommon, and a necessity for amputation of arms, hands and fingers is the general rule rather than an exception.

Analyzing the causes of injuries incurred, it will be seen that all stem from an inability or failure to stop the tractor completely. Thus, means for opening the engine ignition circuit whenever the operator leaves the vehicle, voluntarily or involuntarily, will provide optimum control for eliminating the source from which injury stems. However, as pointed out hereinbefore, prior proposals have failed to meet the practical requirements of such control.

It is an object of the present invention to provide an improved and highly practical safety device for tractor drivers.

In particular, it is an object of the invention to provide an improved ignition circuit control that is practically fool-proof in use, provides the operator complete freedom of movement and insures disconnection of the ignition circuit whenever the driver leaves the general driving area of the tractor.

Another object of the invention is to provide an improved safety device wherein the ignition control means is carried by the operator in couple with his body.

According to the present invention, I provide a safety device comprising an electric cord of a length corresponding to the latitude of movement to be afforded the driver and adapted to be connected in series with one lead of the vehicle ignition switch, an electrical receptacle at the free end of the cord, and a belt adapted to be worn by the driver and carrying a short circuiting plug to which the receptacle is adapted to be connected to close the ignition circuit. When the cord is connected in the vehicle ignition circuit and the receptacle is connected to the short circuiting plug on the belt worn by the operator, the ignition circuit will be closed and the operator will have adequate freedom to sit on the vehicle seat, to stand, and to move about the vehicle driving platform. However, should the driver fall or jump off of the driver's platform, the plug will be disconnected from the receptacle and the ignition circuit will be opened. Thus, the present invention provides a safety device that is entirely practical and insures stopping of the vehicle and any apparatus drawn or driven thereby whenever the operator leaves the driver's platform.

In addition to the foregoing, it is an object of the invention to provide means for mounting the cord to insure disconnection of the cord and plug at the operator's body without possibility of damage to the connection of the cord to the ignition switch and to insure disconnection between the receptacle and plug.

Another object of the present invention is to provide a novel safety belt including a short circuiting plug, wherein the belt cannot be removed from the body of the user without first disconnecting the plug and receptacle.

A further object of the invention is the provision of means whereby the ignition circuit may be closed independently of the operator's body and the belt worn by him to accommodate use of the tractor power take-off for saw-mill operations and the like where the vehicle operator is required to be at a distance from the tractor.

A still further object of the present invention is the provision of a safety device that is extremely economical of manufacture and assembly, is very easily and rapidly installed and is highly practical in use.

Now, in order to acquaint those skilled in the art with one manner of making and using the safety device of the present invention, I shall describe, in connection with the accompanying drawings, a preferred embodiment of the invention.

In the drawings:

Figure 1 is a pictorial representation of a tractor and an implement drawn thereby, with the operator or driver standing on the driver's platform and wearing or using the device of the present invention;

Figure 2 is a plan or layout view of the apparatus of the present invention as the same is associated with an ignition switch;

Figure 3 is a front elevation of the two ends of the safety belt as disconnected from one another; and Figure 4 is a front elevation of the two ends of the safety belt as the same are joined in use.

Referring now to Figure 1, I have shown a pictorial representation of a tractor, indicated generally at 10, an implement or machine, indicated generally at 12, connected to the tractor and adapted to be drawn thereby and an operator standing on the driver's platform of the tractor. The operator or driver has been shown as wearing or employing the safety device of the present invention, which is indicated generally at 14. As will be appreciated from Figure 1, the tractor operator or driver is provided with considerable freedom of movement and, in particular, is free to sit upon the tractor seat or to stand upon the driver's platform to maneuver the vehicle, as is customary.

The safety device of the present invention is shown in detail in Figure 2, wherein the same has been shown as associated with the ignition switch of the vehicle engine. The ignition switch is indicated generally at 16 and includes a pair of terminals 18 and 20 to which leads 22 and 24, respectively, are adapted to be connected, the leads 22 and 24 leading to opposite sides of the remainder of the vehicle engine ignition circuit so that the switch 16 is disposed in series in the ignition circuit. The device of the present invention includes an electric extension cord 26 comprising a pair of insulation sheathed conductors 28 and 30, one conductor being adapted to be connected to one of the leads, such as the lead 24, of the vehicle ignition circuit and the other conductor being adapted to be connected to one terminal, such as the terminal 20, of the engine ignition switch 16, so that, in effect, the extension cord 26 is disposed in series in the engine ignition circuit. The electrical extension cord 26 is preferably a heavy duty cord of a length to accommodate freedom of movement of the driver on the platform of the tractor. At the free or outer end thereof, the extension cord 26 terminates in a receptacle 32, each of the conductors 28 and 30 being connected to one terminal of the receptacle. Thus, the receptacle 32 is disposed in series in the engine ignition circuit. The electrical receptacle 32 is of a customary construction and is preferably sheathed in rubber or other heavy duty insulation, so that the cord and receptacle are electrically insulated against the elements and against the possibility of accidental short circuiting. Due to the fact that a receptacle is provided at the end of the cord, rather than an electrical plug or the like, it is impossible for the vehicle ignition circuit to be inadvertently closed due to short circuiting of the same through the metal of the tractor or the driving platform thereof.

The engine ignition circuit is adapted to be closed by means for short circuiting the terminals of the receptacle 32. Such means preferably takes the form of a U-shaped metal strap formed of conductive material and presenting a pair of prongs, similar to the prongs of an electric lamp cord plug, for entry in the receptacle. Such a strap or plug is shown at 34, the prongs thereof being indicated at 36.

According to the present invention the ignition control means is coupled to the tractor operator's body and to this end the plug 34 is preferably mounted on or carried by an article of wearing apparel adapted to be worn by the tractor operator while operating the tractor. Preferably, the article of wearing apparel takes the form of a belt 38 to which the plug 34 is secured. The nature of the belt and the attachment of the plug thereto may take various forms a preferred form being described hereinafter. In use, the cord 26 is connected as described above and the tractor operator belts the belt 38 about himself. The vehicle ignition switch may then be closed in the customary manner. However, the ignition circuit will not be closed until the receptacle 32 is connected to the plug 34 on the belt 38. Thereafter, the tractor engine may be started and the tractor operated in the customary manner. During operation, the operator is free to stand, sit, or move about within the area of movement accommodated by the length of the cord 26. However, should the operator leave the driving platform at any time, the cord 26 is not of such length as to follow the course of the operator and thus there is an automatic disconnection of the plug 34 and the receptacle 32 to break or open the ignition circuit and stop the tractor and any machinery driven or drawn thereby.

To avoid any undue strain on the connection of the conductors 28 and 30 to the terminal 20 and lead 24 of the engine ignition circuit, it is preferred that means be provided to secure the cord to a stationary part of the tractor with the cord being relatively slack between the ignition switch 16 and such means. To this end, I provide a clamp 40 adapted to be secured to the steering post of the vehicle and to which the cord 26 is clamped or secured. This provides a firm support for the cord to protect the connection of the conductors 28 and 30 in the vehicle ignition circuit and to insure disconnection of the receptacle 32 and plug 34 when the operator leaves the driver's platform of the vehicle.

As is well known, most tractors include a power take-off which is utilized to drive various mobile and stationary machinery. For example, machines such as mechanical corn pickers have a positive drive from the power take-off of the tractor and are also adapted to be drawn by the tractor. However, there are many types of stationary machinery that are adapted to be driven from the tractor power take-off, such as saw mill machinery and the like. When the power take-off of the tractor is utilized to operate or motivate stationary machinery, there is no need for operator to be on the vehicle, the operator's services, in fact, being required at some distance from the tractor. It is essential that any safety device be equipped to accommodate such use of the tractor. In accordance with this requirement, I provide a second U-shaped strap or plug 42 on the clamp 40 so that the receptacle 32 may be plugged thereto to close the ignition circuit as an alternative to the belt carried plug 34. Also, the plug 42 provides a place for storing or supporting the cord 26 and receptacle 32 when the tractor is not in use, rather than to have the cord lay on the tractor platform. The plug 42 is mounted in an insulating block 44 suitably secured to the clamp 40.

Considering now Figures 3 and 4, I have shown a preferred form of the belt of the device of the present invention. The belt may be formed of various materials and of various sizes, but I prefer to use a belt formed of fabric webbing. At one end 46 thereof, the belt carries a plurality of loops 48, preferably formed of metal, through which the opposite end 50 of the belt is passed when the same is secured to a user. It is in the said one end 46 of the belt that the plug 34 is preferably located. As shown, the prongs 36 of the plug extend through the front or loop side of the belt and the base or bight portion of the strap is confined between two layers of the belt. Furthermore, the base or bight portion of the strap is preferably encased in insulating material, as indicated at 52, to insulate the plug from the body of the user. The said opposite end of the belt, 50, terminates in a metal clip 54 to prevent fraying thereof and is provided with a plurality of spaced pairs of apertures 56 therein for the passage of the prongs 36 of the plug 34. The apertures 56 are preferably bounded by grommets 58 to prevent fraying of the belt. For convenience herein, the end 50 of the belt will be referred to as the free end thereof and the end 46 of the belt as the buckle end thereof. Preferably, the belt is of a sufficient length to be worn over winter outer clothing, as well as directly over the waist of the user.

As the belt is applied to the tractor operator, the free end 50 thereof is passed under the loops or buckles 48 and over the prongs 36 of the plug 34 until the belt snugly engages the waist of the operator. The prongs 36 are then passed through the nearest pair of apertures 56 and the belt is thus secured to the operator. Now, when the receptacle 32 is connected to the plug 34, it will be apparent that the belt cannot be removed without first disconnecting the plug 34 from the receptacle 32. Accordingly, a further safety factor is provided insuring proper use of the device of the present invention by the operator.

The manner of use of the safety device of the present invention is clearly shown in Figure 1, wherein the tractor operator is shown as wearing the belt and wherein the receptacle at the end of the extension cord 26 is connected to the short circuiting plug on the belt. The length of the cord between the clamp 40 and the receptacle 32 is such as to afford the operator a predetermined latitude of movement, namely, freedom for movement within the confines of the driver's platform. Should the operator fall or be jostled from the tractor platform, the clamp 40 will hold the cord 26 and receptacle 32 stationary so that the plug 34 will be automatically disconnected from the receptacle 32 to break or open the engine ignition circuit. Thus, engine operation will be discontinued and the tractor will stop its forward motion and discontinue the positive drive of any particular type of machinery drawn thereby. Likewise, should the operator be desirous of cleaning any moving parts of the machinery, and stops the forward progress of the tractor to effect such cleaning, immediately upon his attempting to leave the driving platform, the plug 34 will be disconnected from the receptacle 32 to open the ignition circuit. Thus, it will be appreciated that the device of the present invention, when used properly and as intended, will protect the vehicle operator from accidents and from his own folly.

The advantages of the safety device of the present invention are numerous and include the obvious economical construction and assembly of the device, the obvious ease and speed of connection of the device to a tractor, the practicality of the device, the freedom of movement that the device accommodates, the positive disconnection of the ignition circuit whenever the operator leaves the vehicle, the fact that the switching or disconnecting means are always within ready access or reach of the tractor driver for effecting quick stopping of the tractor, the fact that the belt cannot be removed without disconnecting the ignition circuit, the provision of the second plug or jumper 42 for accommodating power take-off operation of the tractor engine, and the fact that the ignition control is coupled to the body of the operator or driver of the vehicle.

Hereinbefore, the safety device of the present invention has been described with particular reference to a specific embodiment including a particular type of short circuiting means and a particular belt by means of which said short circuiting means is carried. It will be appreciated by those skilled in the art, that the invention may take other forms including other types of short circuiting means and other articles of wearing apparel and the like by means of which the short circuiting means may be coupled to the body of the vehicle operator. Likewise, the safety device of the invention is applicable to vehicles other than tractors.

Thus, while I have shown and described what I regard to be a preferred embodiment of my invention, it will be apreciated that variations, modifications, and changes may be made therein without departing from the scope of the invention, as defined by the appended claims.

I claim:

1. A safety device, for the drivers of tractors having internal combustion engines including an electrical ignition circuit, comprising an electric cord adapted to be connected in series with the tractor ignition circuit, an electric receptacle connected in series with said cord and disposed at the free end thereof, a belt adapted to be worn by the tractor driver, and a short circuiting plug carried by said belt, said receptacle being adapted to be connected to said plug to close the tractor ignition circuit, said cord being of a length to accommodate movement of the driver while on the tractor only, whereby upon removal of the driver from the tractor said plug and receptacle are disconnected to open the ignition circuit, said belt including a free end and a buckle end, said plug being carried by the buckle end of said belt, the free end of said belt having apertures therein for the passage of said plug, whereby the driver can not remove said belt when said receptacle is connected to said plug without opening the tractor ignition circuit.

2. A safety device, for the drivers of tractors having internal combustion engines including an electrical ignition circuit, comprising an electric cord adapted to be connected in series with the tractor ignition circuit, an electric receptacle connected in series with said cord and disposed at the free end thereof, a belt adapted to be worn by the tractor driver, said belt including a free end and a buckle end, a short circuiting plug secured to the buckle end of said belt, the free end of said belt having apertures therein for the passage of said plug, said receptacle being adapted to be connected to said plug to close the tractor ignition circuit, said receptacle preventing removal of said belt from the driver without disconnection of said receptacle and plug, said cord being of a length to accommodate movement of the driver while on the tractor only, whereby upon removal of the driver from the tractor said plug and receptacle are disconnected to open the ignition circuit, a clamp secured to said cord intermediate the ends thereof and adapted to be secured to a stationary portion of the tractor, said clamp anchoring said cord to insure disconnection of said plug and receptacle upon removal of the driver from the tractor, and a second short circuiting plug carried by said clamp to accommodate closing of the ignition circuit independently of the belt worn by the tractor driver.

3. A safety device of the character described comprising an electrical cord, a receptacle at one end of said cord, said cord and receptacle being sheathed in insulation, a short circuiting plug detachable from and attachable to said receptacle, and an article of wearing apparel to which said short circuiting plug is secured, said article of wearing apparel comprising a belt having a buckle end and a free end, said plug being secured to the buckle end and having prongs extending therefrom, the free end of said belt having apertures therein for the passage of said prongs when said belt is worn by a user, said receptacle being attachable to said prongs over both ends of said belt whereby said belt cannot be removed without first detaching said receptacle.

References Cited in the file of this patent
UNITED STATES PATENTS

| | | |
|---|---|---|
| 747,370 | Brislin | Dec. 22, 1903 |
| 1,075,973 | Hirsch | Oct. 14, 1913 |
| 1,296,088 | Jones | Mar. 4, 1919 |
| 2,612,232 | Morrison | Sept. 30, 1952 |
| 2,640,898 | White | June 2, 1953 |
| 2,660,715 | Glass et al. | Nov. 24, 1953 |